(12) United States Patent
Wang

(10) Patent No.: US 7,617,801 B2
(45) Date of Patent: Nov. 17, 2009

(54) BUCKLE FOR PET COLLAR

(76) Inventor: Chih-Hisn Wang, P.O. Box 44-2049, Taipei (TW) 10668

( * ) Notice: Subject to any disclaimer, the term of this patent is extended or adjusted under 35 U.S.C. 154(b) by 117 days.

(21) Appl. No.: 11/889,671

(22) Filed: Aug. 15, 2007

(65) Prior Publication Data

US 2009/0044764 A1  Feb. 19, 2009

(51) Int. Cl.
*A01K 27/00* (2006.01)
*A44B 11/20* (2006.01)

(52) U.S. Cl. .......................... 119/863; 24/186

(58) Field of Classification Search ......... 119/856–858, 119/863; 24/176, 177, 186, 174, 180
See application file for complete search history.

(56) References Cited

U.S. PATENT DOCUMENTS

| | | | | |
|---|---|---|---|---|
| 71,116 A | * | 11/1867 | Andrews | 24/176 |
| 204,342 A | * | 5/1878 | Landon et al. | 24/177 |
| 258,715 A | * | 5/1882 | Cooper | 24/165 |
| 318,179 A | * | 5/1885 | Ginger | 24/165 |
| 322,087 A | * | 7/1885 | Basinger | 24/176 |
| 400,891 A | * | 4/1889 | Baker | 24/164 |
| 540,261 A | * | 6/1895 | Law | 54/69 |
| 555,000 A | * | 2/1896 | George | 24/176 |
| 791,053 A | * | 5/1905 | Stenzy | 24/186 |
| 805,336 A | * | 11/1905 | Bennett | 24/176 |
| 843,434 A | * | 2/1907 | Blum | 24/186 |
| 850,875 A | * | 4/1907 | Blum | 24/186 |
| 1,747,401 A | * | 2/1930 | Stickling | 24/186 |

* cited by examiner

*Primary Examiner*—Son T. Nguyen
(74) *Attorney, Agent, or Firm*—Banger Shia

(57) ABSTRACT

A pet collar includes a buckle having a through hole and a first transverse bar and a second transverse bar are connected to two sidewalls of the buckle. A first protrusion extends from a top of the first transverse bar and two second protrusions extend from two respectively undersides of the first and second ends of the frame respectively. A belt has a first end fixed to the second end of the buckle and a second end of the belt extends through a first opening between the first transverse bar and the first end of the buckle via the underside of the first end of the buckle and passes over the first and second transverse bars and extends through the second opening between the second transverse bar and the second end of the buckle. The holes in the belt are engaged with the first protrusion and the two second protrusions.

4 Claims, 4 Drawing Sheets

BUCKLE FOR PET COLLAR

BACKGROUND OF THE INVENTION (1) Field of the Invention

The present invention relates to a pet collar with a plastic buckle which allows the user to easily secure the collar at three different positions.

(2) Description of the Prior Art

A conventional pet collar generally includes a belt and a buckle which is usually made by metal and one end of the belt is fixed to the buckle and the other end of the belt passes through the buckle and a tongue on the buckle extends through one of the holes in the belt. The metal buckle requires several manufacturing steps including forming a specific shape and electro-plating, and a special machine is required to connect the tongue to the frame of the buckle. The metal buckle is heavy and the manufacturing cost is high which cannot meet the customers' needs. Besides, the tongue extends inclinedly through the hole in the belt and the tongue can be disengaged from the hole when pulling the pet collar.

The present invention intends to provide a pet collar with a plastic buckle which includes three protrusions so that the belt can be positioned at three positions when buckled.

SUMMARY OF THE INVENTION

The present invention relates to a pet collar which comprises a buckle with a through hole defined therethrough and a first transverse bar and a second transverse bar are connected to two sidewalls extending from two opposite sides of the buckle so as to define a first opening between the first transverse bar and a first end of the buckle, a second opening defined between the second transverse bar and a second end of the buckle. A first protrusion extends from a top of the first transverse bar and two second protrusions extend from two respectively undersides of the first and second ends of the buckle. A belt has a first end fixed to a second end of the buckle and a second end of the belt extends through the first opening via the underside of the first end of the buckle and passes over the first and second transverse bars and extends through the second opening. The belt has a plurality of holes and the first protrusion and the two second protrusions are engaged with three of the holes in the belt.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
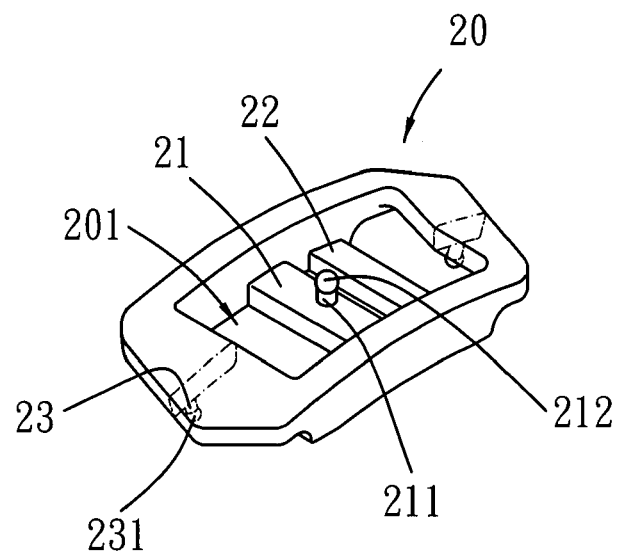
FIG. 1 is a perspective view to show the buckle of the pet collar of the present invention.
Figure 2:
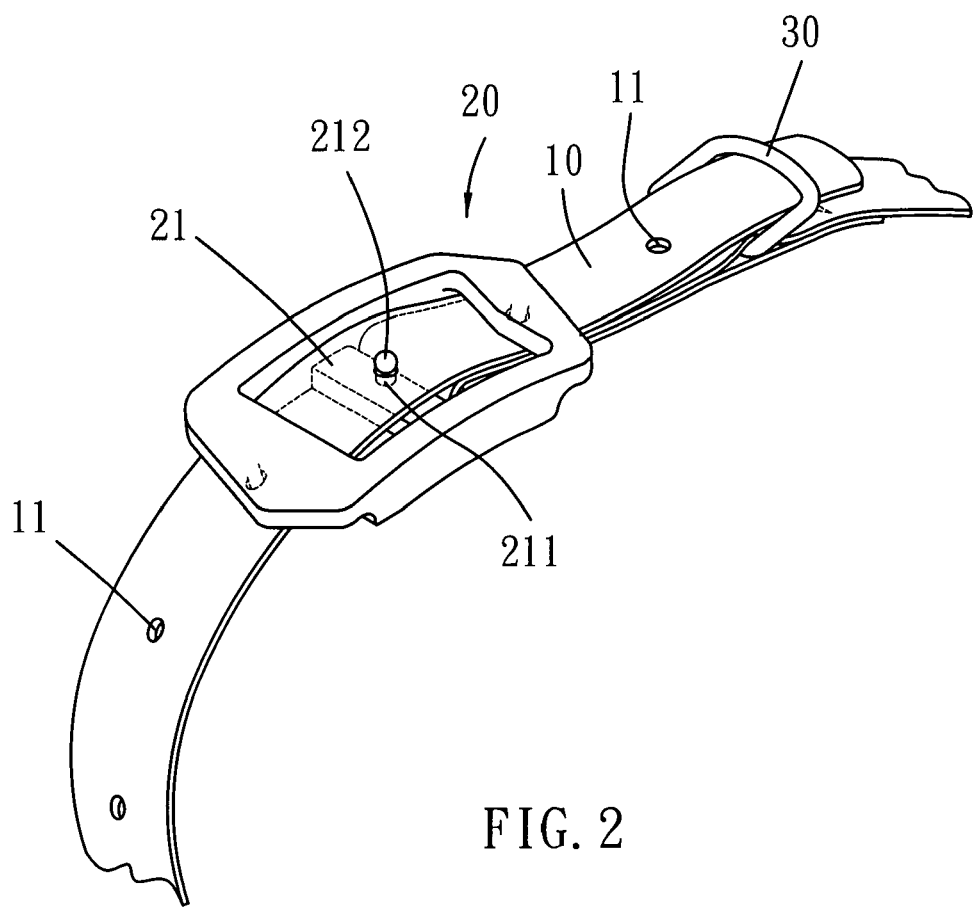
FIG. 2 is a part of the pet collar of the present invention.
Figure 3:
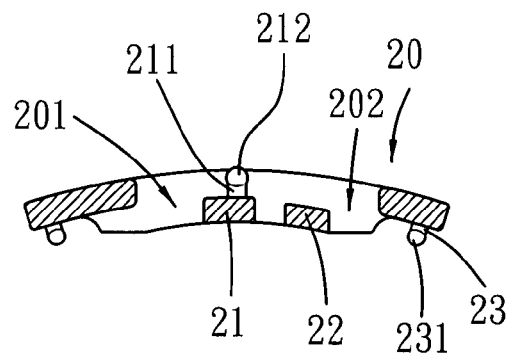
FIG. 3 is a cross sectional view of the buckle of the pet collar of the present invention.
Figure 4:
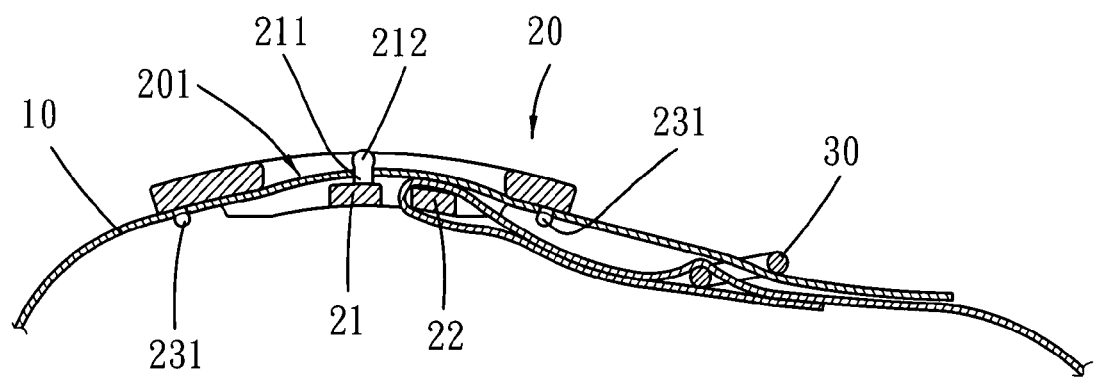
FIG. 4 is a cross sectional view of the part of the pet collar in FIG. 2.
Figure 5:
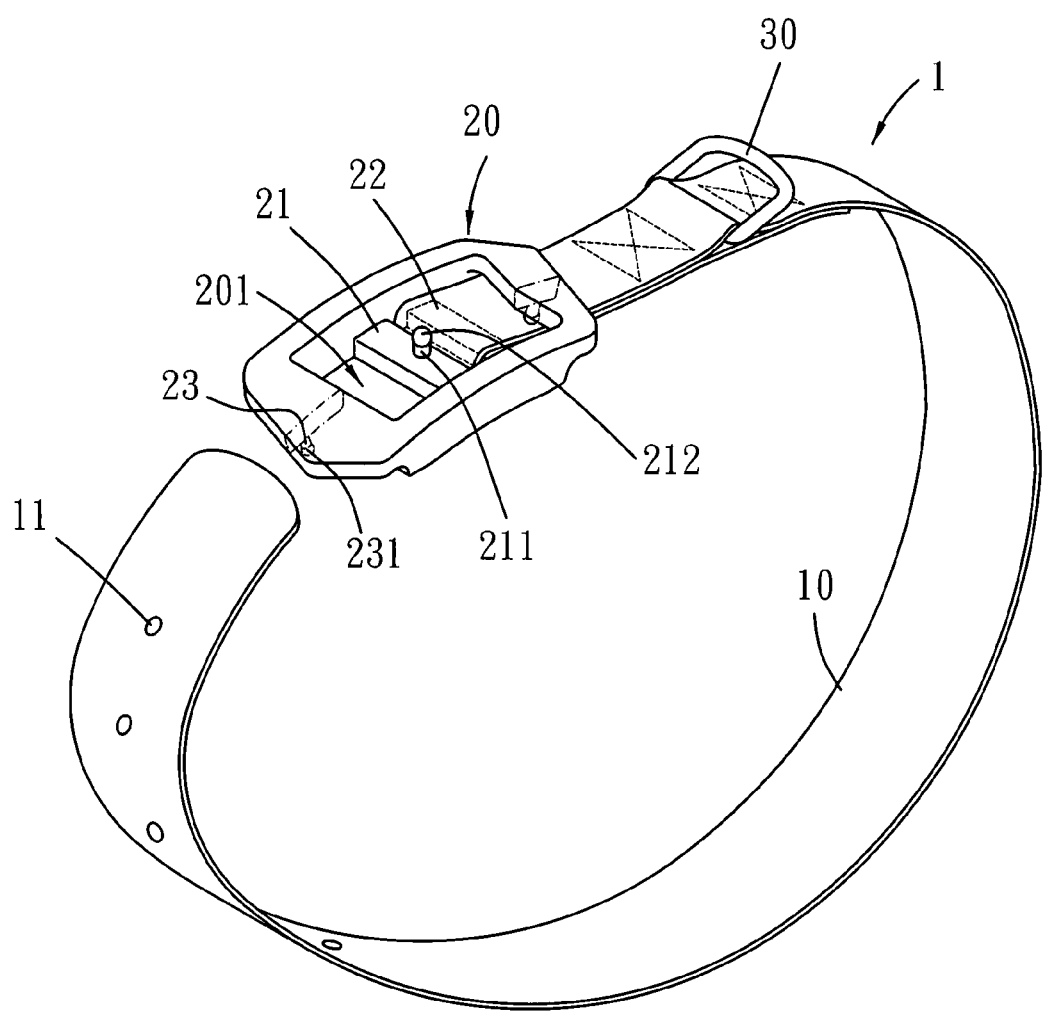
FIG. 5 is a perspective view to show the pet collar with the belt is not yet connected to the buckle.

Referring to FIGS. 1 to 5, the pet collar of the present invention comprises a buckle 20 which is made by plastic material and includes a through hole defined therethrough. A first transverse bar 21 and a second transverse bar 22 are connected to two sidewalls extending from two opposite sides of the buckle 20. A first protrusion 211 extends from a top of the first transverse bar 21 and two second protrusions 23 extend from two respectively undersides of the first and second ends of the buckle 20. A first opening 201 is defined between the first transverse bar 21 and the first end of the buckle 20 and a second opening 202 is defined between the second transverse bar 22 and the second end of the buckle 20. Each of the first and second protrusions 211, 23 includes an enlarged end 212/231 on a distal end thereof.

A belt 10 has a first end thereof extends through the second opening 202 via the underside of the second end of the buckle 20 and goes around the second transverse bar 22 and is fixed to the belt 10. A second end of the belt 10 extends through the first opening 201 via the underside of the first end of the buckle 20 and passes over the first and second transverse bars 21, 22 and extends through the second opening 202. The second end of the belt 10 then extends through a keeper 30 connected to the first end of the belt 10. The belt 10 has a plurality of holes 11 and the first protrusion 211 and the two second protrusions 23 engaged with three of the holes 11 in the belt 10.

It is noted that the distance between the first protrusion 211 and the second protrusion 23 on the first end of the buckle 20 is the same as the distance between the first protrusion 211 and the second protrusion 23 on the second end of the buckle 20. The distance between adjacent holes 11 in the belt 10 is the same as the distance between the first protrusion 211 and the two second protrusions 23. Therefore, the use can easily mount the three holes 11 to the first and second protrusions 211 and 23. The two sidewalls are shorter than a length of the buckle 20 so as to form an open space beneath the two ends of the buckle 20 and the open spaces are convenient for the user to check the engagement of the holes in the belt 10 and the first protrusion 211 and the two second protrusions 23.

The belt 10 is mounted to the first protrusion 211 form the top of the buckle 20 and the belt 10 is mounted to the two second protrusions 23 from the underside of the buckle 20. The opposite directions of engagement ensure that the first and second protrusions 211, 23 are not easily disengaged from the holes 11 of the belt 10 when pulling the pet collar.

Figure 6:
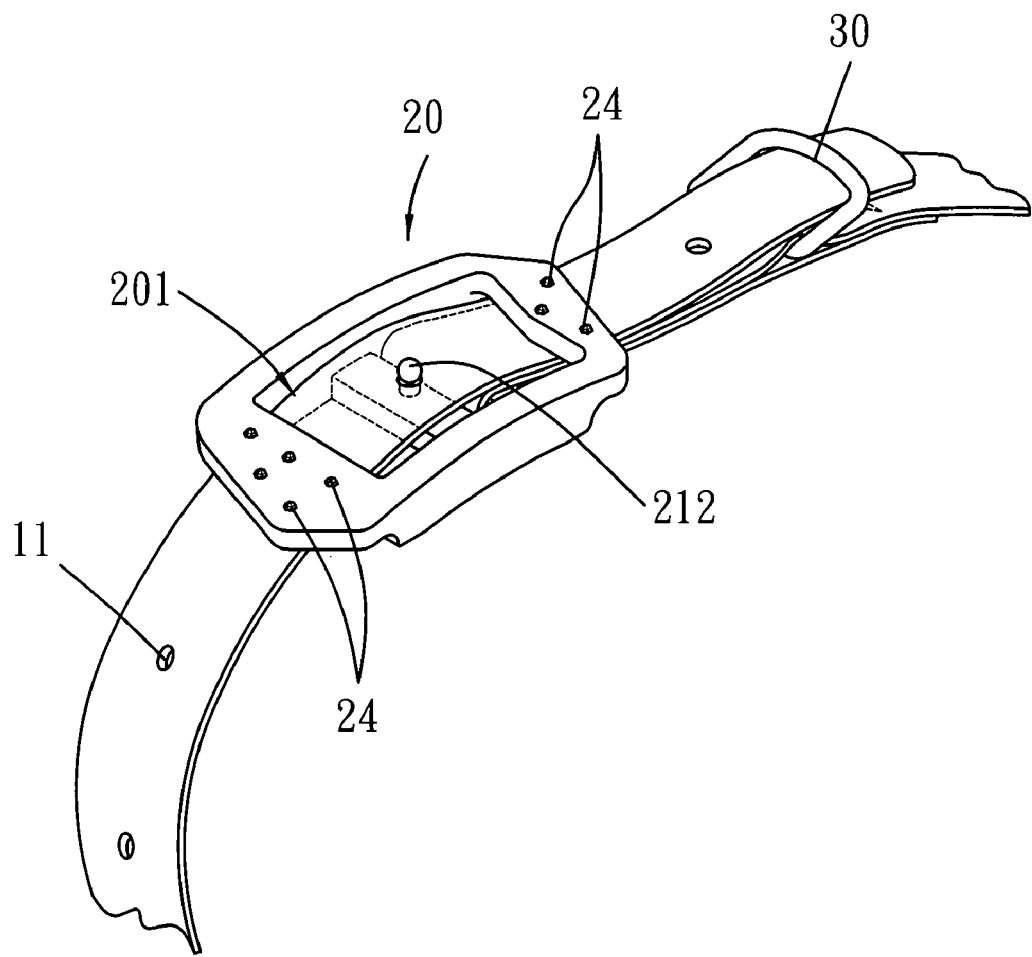
FIG. 6 shows that decoration is made on the buckle of the pet collar of the present invention.

FIG. 6 shows that decorations 24 can be made on the buckle 20 and the decorations 24 can be gems.

While we have shown and described the embodiment in accordance with the present invention, it should be clear to those skilled in the art that further embodiments may be made without departing from the scope of the present invention.

What is claimed is:

1. A pet collar, comprising:
a buckle with a through hole defined therethrough and a first transverse bar and a second transverse bar connected to two sidewalls extending from two opposite sides of the buckle, a first protrusion extending from a top of the first transverse bar, a first opening defined between the first transverse bar and a first end of the buckle, a second opening defined between the second transverse bar and a second end of the buckle, two second protrusions extending from two respectively undersides of the first and second ends of the buckle, and a belt having a first end fixed to a second end of the buckle and a second end of the belt extending through the first opening via the underside of the first end of the buckle and passing over the first and second transverse bars and extending through the second opening, the belt having a plurality of holes and the first protrusion and the two second protrusions engaged with three of the holes in the belt;

wherein each of the first and second protrusions includes an enlarged end on a distal end thereof;

wherein a distance between the first protrusion and the second protrusion on the first end of the buckle is the same as a distance between the first protrusion and the second protrusion on the second end of the buckle;

wherein a distance between adjacent holes in the belt is the same as the distance between the first protrusion and the two second protrusions;

wherein the two sidewalls are shorter than a length of the buckle;

wherein decorations can be made on the buckle and the decorations can be gems.

2. The pet collar as claimed in claim 1, the first end of the belt extends through the second opening via the underside of the second end of the buckle and goes around the second transverse bar and is fixed to the belt.

3. The pet collar as claimed in claim 1, wherein a keeper is connected to the first end of the belt.

4. The pet collar as claimed in claim 1, wherein the buckle is made by plastic.

* * * * *